United States Patent [19]

Chanko

[11] Patent Number: 5,037,047
[45] Date of Patent: Aug. 6, 1991

[54] TILT STAND

[75] Inventor: Robert Chanko, Windsor, Canada

[73] Assignee: Fabricated Steel Products, Windsor, Ont., Canada

[21] Appl. No.: 359,266

[22] Filed: May 31, 1989

[51] Int. Cl.$^5$ ............................................. A47F 5/12
[52] U.S. Cl. .................................. 248/140; 248/136; 414/778
[58] Field of Search .............. 248/131, 133, 135, 136, 248/137, 138, 139, 140, 141, 142, 143, 371; 211/49.1; 414/421, 422, 604, 778

[56] References Cited

U.S. PATENT DOCUMENTS

| | | |
|---|---|---|
| 2,180,641 | 11/1939 | Milton ................................. 248/140 |
| 3,430,907 | 3/1969 | Bruhn et al. ......................... 248/140 |
| 4,293,264 | 10/1981 | Gilts et al. ........................... 211/50 |
| 4,315,711 | 2/1982 | Koscho ............................... 211/49.1 |
| 4,753,408 | 6/1988 | Wailes ................................. 248/371 |

Primary Examiner—Ramon O. Ramirez
Attorney, Agent, or Firm—Ivor M. Hughes; Neil H. Hughes

[57] ABSTRACT

A tilt apparatus for tilting a container from a first position, preferably horizontal, to a position skewed to the first position, the tilt apparatus comprising a stationary frame having two sides and disposed proximate the first position, the stationary frame having detent means disposed therewith, a movable frame moveable from the first position being substantially parallel in extension to the stationary frame to a position skewed to the first position and the stationary frame, the movable frame being moveably affixed proximate one side of the stationary frame, the movable frame having locking means and release means disposed therewith, the locking means being actuated by gravity to cooperatively lock with respect to the detent means of the stationary frame when the moveable frame is tilted to allow the locking means to so actuate thus locking a container in a tilted position, the release means being actuated by a remote device, such as a fork of a fork truck, to disengage the locking means of the moveable frame from the detent of the stationary frame whereby the moveable frame is repositioned from a position skewed to the first position and the stationary frame to a position substantially parallel in extension to the first position and the stationary frame.

31 Claims, 4 Drawing Sheets

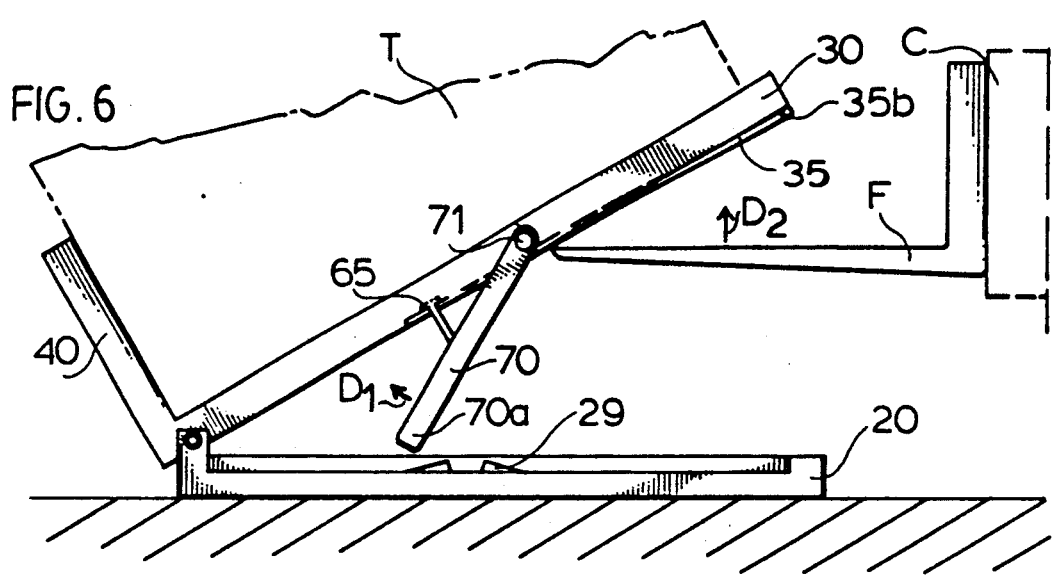
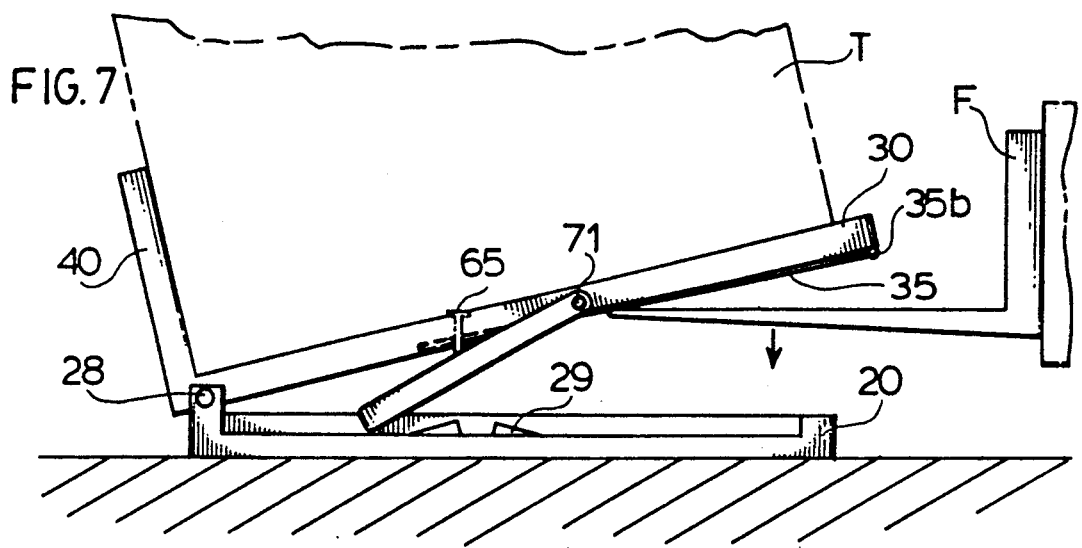
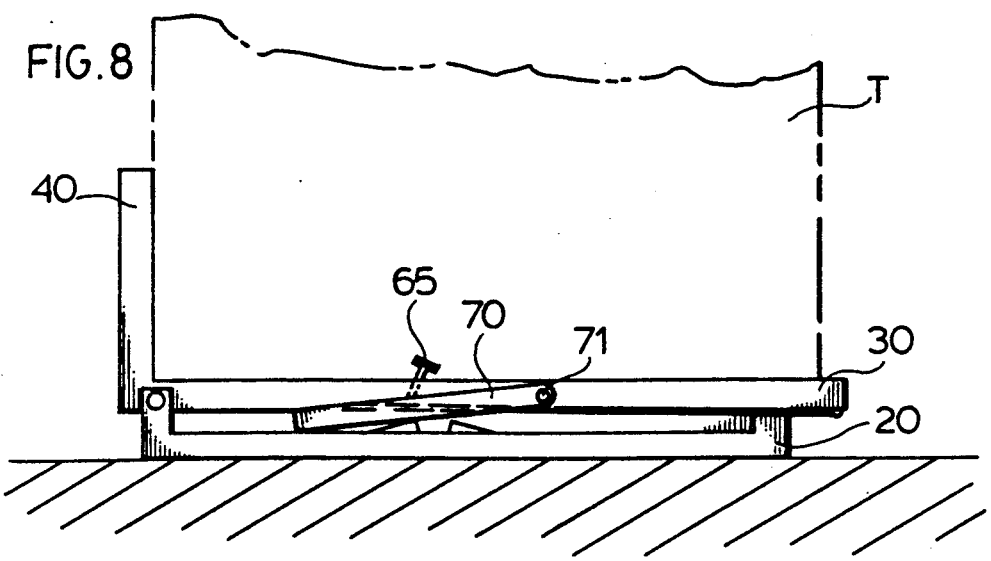

TILT STAND

FIELD OF INVENTION

This invention relates to support stands which support and tilt a container from a position wherein the bottom of the container is in a horizontal position to a position where the bottom of the container is skewed to the horizontal.

BACKGROUND OF INVENTION

A great deal of handling is involved in a stamping process for randomly shaped metal parts. Often the parts are fabricated from presses and must be set aside as work in progress requiring further finishing steps prior to final shipping of the manufactured product. The nature of metal stampings when stacked upon one another is to use up considerable amount of space in a shipping container if they are not carefully inserted within the shipping container. Often the shipping container is bulky especially if the stamped parts are relatively large requiring an operator to stretch beyond the abilities of the human frame. Unfortunately an number of injuries have occurred to those individuals assigned to stacking finished stamped articles in a shipping tote. Not only is there pain and suffering for the individual, but from an economic standpoint to the budget of a company a compensation case is not welcome.

The totes normally used in stacking finished parts are made from metal or in the case of finished goods made from cardboard. The cardboard totes are generally 4 ft cubed. The metal totes currently used in this process are 7 ft long and 3.5 ft wide and 3 ft deep. As can be readily seen from the dimensions of both the disposable and the recyclable totes they are not easy to load without some sort of assist to the operator.

In order to try and develop an assist for the operator the totes have been placed on a permanent rack developed with one end higher than the other. A fork truck would then place the tote on the rack generally set at an angle of 30° to 45°. This would permit the operator of a metal die stamping machine to insert the finished or in progress materials into the tote easily. However, there was a consider amount of handling of these totes by a fork truck operator. Further there is no adjustability in the angle at which the tote is set. It would be advantageous to an operator to be able to adjust this angle as the tote becomes fuller and fuller.

In one example, the flow of materials through a stamping operation would be as follows. Blanks are prepared for the presses and stacked within a bedstead as it is known in the industry or tote. The tote is then carried to the presses and set beside the presses where an operator accesses the materials in the bedstead, now located on a tilt stand, the operator then inserting the blank in the metal press forming the randomly shaped article and then placing that item in an outgoing tote which, depending on the number of processes left to be accomplished on the metal stamping, may be stacked roughly in an open tote or place in a tote or tilt stand. If further processes such as welding for example, are required the tote is then transported to the welding area where the parts are removed for spot welding and are loaded by an operator into the finished box which would be on a tilt stand. The operator is able to access the tote in part, but is not able to adjust the angle at which the tote is set at any time.

Within the prior art there exists U.S. Pat. No. 4,315,711 in which is described a tilt support packing apparatus specifically designed for glass. The apparatus is of generally rectangular form and has a stationary frame and a moveable frame. The moveable frame having a rocking portion with pins therein which engage with holes on the stationary frame when the frame is tilted. The apparatus when tilted is locked in position by an upstanding strut. However, the tilting apparatus is not adjustable in position. The strut must be manually moved into position as stated at column 4, line 45 of the disclosure. There is no mention within the teachings of U.S. Pat. No. 4,315,711 as to the automatic engagement of the strut 56 when the fork truck operator positions the tilt stand correctly. Affixed portions 59 and 60 are provided which allow for the tilting of the stand by a fork truck as described at column 4, line 13. However, once the tilting apparatus is positioned by the fork truck the operator secures the rack to the frame and manually tilts the frame 11 and the rack 17 rearwardly by raising the front of the frame 11 until the rack 17 rests against the rail 54. This is clearly stated at column 4, line 37 through 47. Then as it continues at line 48 the empty rack is positioned adjacent the fabricating line for manual loading within the convenient reach of the operator for inserting sheets of glass therein. U.S. Pat. No. 4,293,264 is another example of such a tilting apparatus.

It may not be practical to manually lift the tote from a horizontal to a tilted position and would be more advantageous if the fork truck bringing the tote to its stand would be able to tilt the stand for the operator and be able to release the stand for the operator as well. If the operator of the U.S. Pat. No. 4,315,711 must also tilt the packed tote back to the horizontal it would be both cumbersome and time consuming. There is no mention of it being tilted otherwise in the disclosure.

It is therefore a primary object of this invention to provide an improvement to tilt stands such as those found in the prior art wherein a fork truck will tilt the stand to the desired position without the need to dismount from the fork truck or to have an assistant to set the strut and thereby lock the tilt stand in its tilted position.

It is a further object of this invention to provide a tilt stand which is releasable when in its tilted position to a position parallel with the horizontal without an operator's assistance, having a release mechanism built therein which is enabled by the positioning of a fork truck fork against the release mechanism thereby releasing the tilt stand to a horizontal position.

Further and other objects of the invention will become apparent to a man skilled in the art when considering the following summary of the invention and the more detailed description of the preferred embodiments illustrated herein.

SUMMARY OF THE INVENTION

According to one aspect of the invention there is provided a tilt apparatus for tilting a container from a first position, preferably horizontal, to a position skewed to the first position, the tilt apparatus comprising a stationary frame having two sides and disposed proximate the first position, the stationary frame having detent means disposed therewith, a moveable frame moveable from the first position being substantially parallel in extension to the stationary frame to a position skewed to the first position and the stationary frame, the moveable frame being moveably affixed proximate one side of the stationary frame, the moveable frame having locking means and release means disposed therewith, the locking means being actuated by gravity to cooperatively lock with respect to the detent means of the stationary frame when the moveable frame is tilted to allow the locking means to so actuate thus locking a container in a tilted position, the release means being actuated by a remote device, such as a fork of a fork truck, to disengage the locking means of the moveable frame from the detent of the stationary frame whereby the moveable frame is repositioned from a position skewed to the first position and the stationary frame to a position substantially parallel in extension to the first position and the stationary frame.

According to yet another aspect of the invention there is provided a tilt stand for tilting a container from a generally horizontal position to a position skewed to the horizontal, the tilt stand comprising a stationary frame having two sides and extending substantially horizontally, the stationary frame being reinforced by reinforcing means and having disposed therewith detent means, a pivotable frame having reinforcing means therewith to bolster the frame to accept the container, the pivotable frame pivotable from a position generally parallel in extension to the stationary frame to a position generally skewed to the extension of the stationary frame, the pivotable frame being pivotably affixed proximate one side of the stationary frame, the pivotable frame having locking means and release means disposed therewith, the locking means being actuated by gravity to cooperatively lock with respect to the detent means of the stationary frame when the pivotable frame is tilted to allow the locking means to activate thus locking a container in a tilted position with its bottom at a skewed angle to the horizontal, the release means being actuated by a remote device, such as a fork of a fork truck, to disengage the locking means of the pivotable frame from the detent means of the stationary frame, whereby the pivotable frame and a container therewith is repositioned from a position skewed to the horizontal to a position parallel in extension to the stationary frame. In a preferred embodiment of the invention the stationary frame and the pivotable frame further comprises generally upstanding reinforcing portions disposed at the sides of the frames which are affixed to assist in supporting a container when tilted, preferably the upstanding portions of the stationary frame cooperating with the upstanding portions of the pivotable frame, when a container is in a tilted position.

In another preferred embodiment of the tilt stand the locking means of the pivotable frame comprises at least one strut (and preferably two one disposed at each end of the tilt stand interconnected by a shaft having counterweights therewith) having two ends, and being pivotably affixed at one end to the pivotable frame and free at one other end to rotate when free to do so, preferably assisted to rotate by counterweights to engage the detent means of the stationary frame preferably the at least one strut being interconnected to the release means which when actuated releases the at least one strut of the pivotable frame from the detent means of the stationary frame, preferably the detent mean being at least two opposed teeth having a space disposed therebetween for locking engagement of the free end of the at least one strut.

BRIEF DESCRIPTION OF THE DRAWINGS

FIG. 6 is a view similar to that of FIG. 5 illustrating the release operation of the latching portion of FIG. 5 illustrated in a preferred embodiment of the invention.

FIG. 7 and FIG. 8 are views similar to that of FIG. 6 illustrating a sequence of events following FIG. 7 illustrated in a preferred embodiment of the invention.

DETAILED DESCRIPTION OF THE PREFERRED EMBODIMENTS OF THE INVENTION

Figure 1:
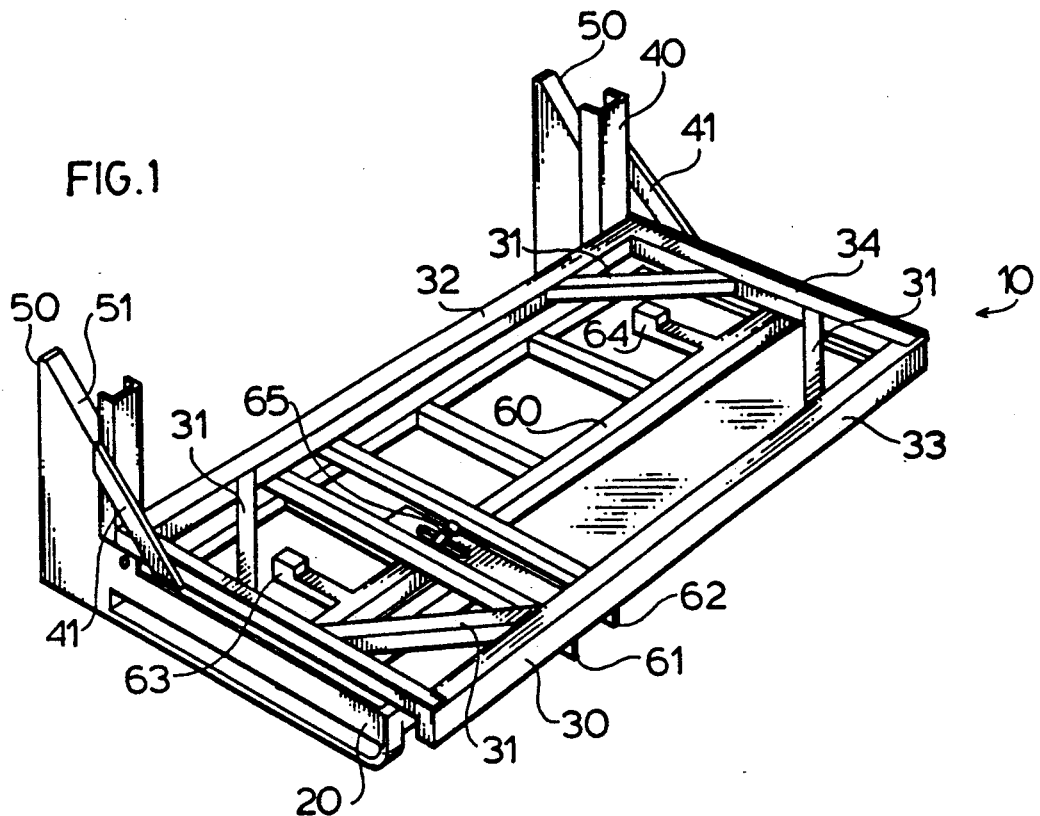
FIG. 1 is a perspective view of the tilt stand illustrated in its horizontal position prior to being tilted in a preferred embodiment of the invention.

Referring now to FIG. 1, there is illustrated the tilt stand apparatus 10 having three major portions therein, a stationary frame portion 20 located on the bottom of the tilt stand, a moveable frame portion 30 being movable from a generally horizontal position to a position generally skewed to the horizontal, and a release and latching component formed from a spring steel portion 60 affixed to latching struts 70. The details of the interrelationships between the major components will be described hereinafter. Such a tilt stand is used for tilting a container as described in the background of the invention.

Figure 2:
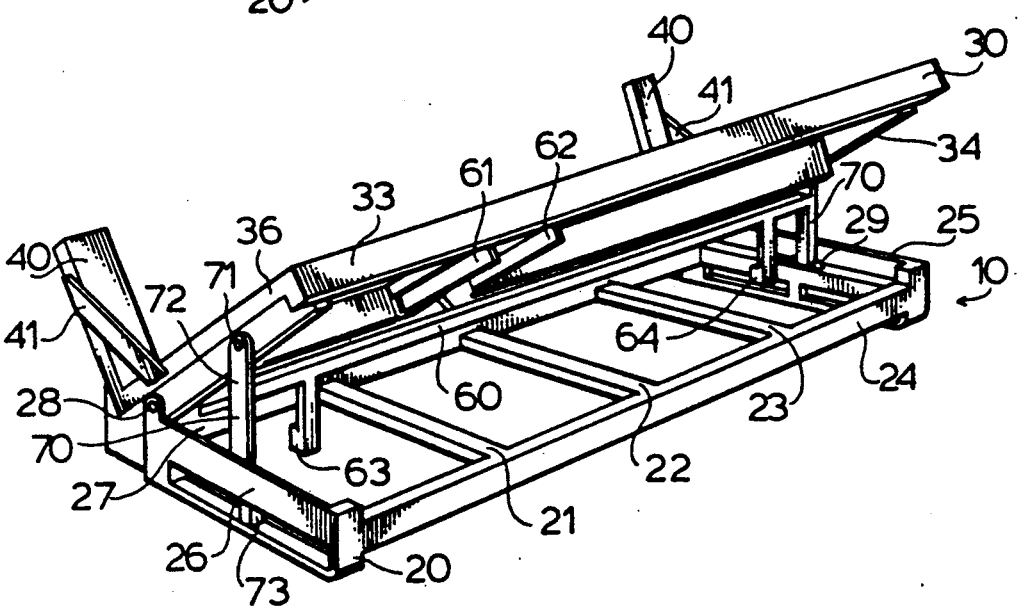
FIG. 2 is a perspective view of the tilt stand of FIG. 1 illustrated in a tilted position relative to the horizontal in a preferred embodiment of the invention.

Referring now to FIG. 1 and FIG. 2 the tilt stand 10 is provided with a generally horizontal stationary frame section 20 having end portions 26 and 25 and side portions 24 and 27. The side portions are further braced by portions 21, 22, and 23. Formed within the side portions 25 and 26 and recessed from the top thereof are detent portions 29 the use of which will be hereinafter described. Hinged at the side 27 of the framing portions via a pin 28 is a moveable frame portion 30 having end portions 34 and 36 interconnected by side portions 32 and 33. Each corner of the moveable frame 30 is braced by bracing portions 31. At each end of the moveable framing portion 30 intermediate the sides 32 and 33 are disposed struts 70 for engagement with the detents 29 of the stationary frame section 20. A more detailed description of the interrelationships will be described hereinafter. Interconnecting the struts 70 to the moveable frame section 30 are pivots 71 which allow the struts to pivot freely when free to do so. Interconnecting the struts disposed at each end of the display stand 10 are spring steel member 60 having lug portions 63 and 64 extending away therefrom the purpose for which these are provided will be hereinafter described in detail. At the side of the display stand adjacent the side 32 of the moveable frame 30 are located upwardly extending support portions 40 and braces 41 which will support a container or tote leaning there against. It is therefore important that the sizing be correct for the upwardly extending portions 40 and braces 41 depending on the weight load to bear against their abutting portions. The length of the member 40 must also be taken into consideration and will change from tote to tote. Of course, it is recommended that they extend above the center of gravity of the tote being tilted and beyond that depending on the angle at which the tote is tilted. Located on the bottom of the moveable frame portion 30 are fastened channel portions 61 and 62 which define therebetween a recess wherein a release mechanism 35 is disposed as best seen in relation to FIG. 3, the release portion for releasing the struts when they are latched in position abutting the detents 29 on the stationary frame 20.

Figure 3:
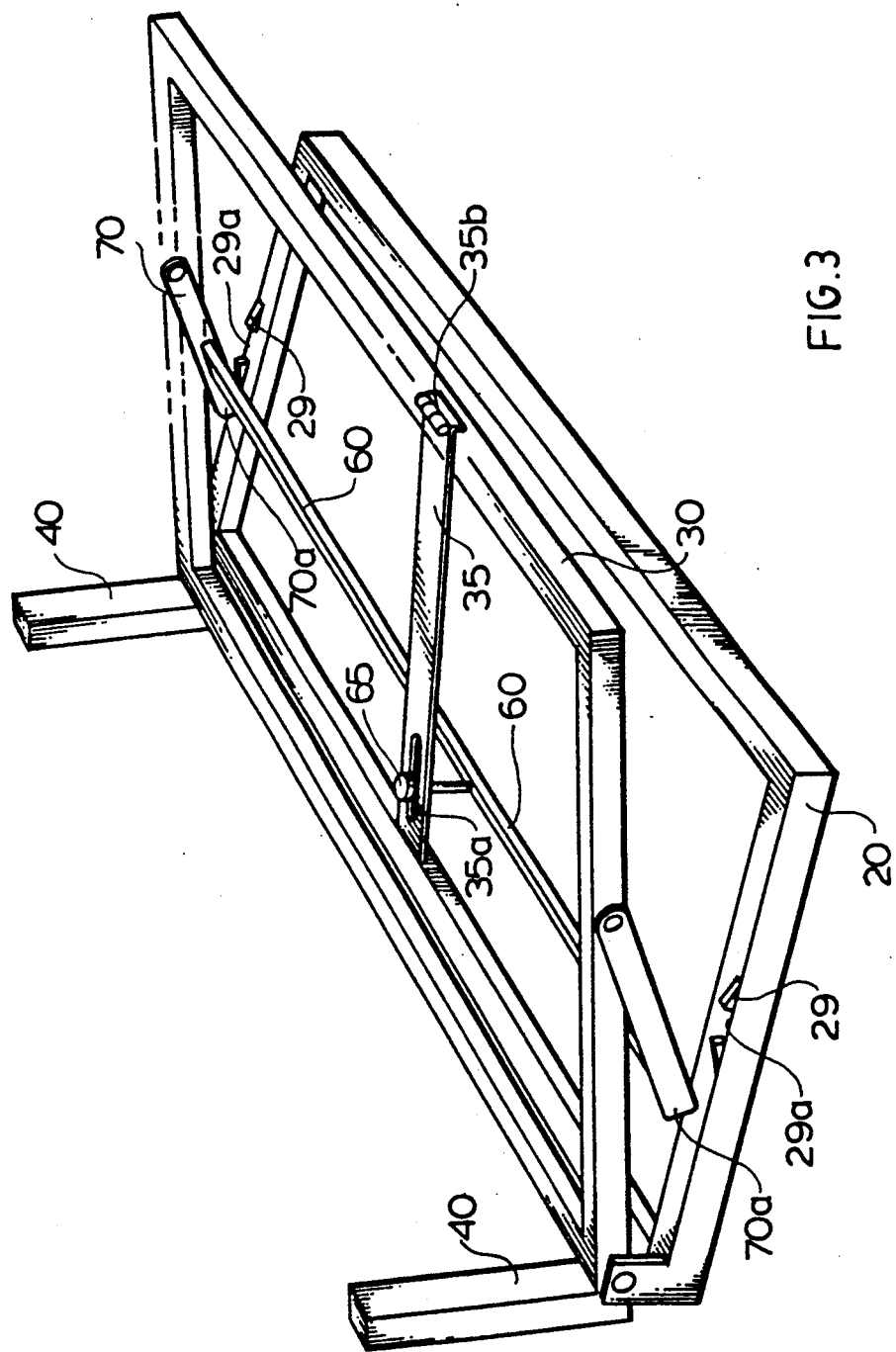
FIG. 3 is a schematic view of the tilt stand in a partially tilted position with the reinforcing portions of the frame members striped away to illustrate the interrelationships of the latching and release mechanism in a preferred embodiment of the invention.

Referring now to FIG. 3, the tilt stand is illustrated schematically being stripped of the bracing sections in simplistic terms to illustrate and describe the interrelationship of the portions shown. The framing section 20 of tilt stand 10 having disposed thereon detent portions 29 at each end of the stationary framing section 30 having a recess 29a disposed therebetween each pair of detents to secure the strut 70 at end 70a therein as best seen in relation to FIG. 5 when the tilt stand is tilted to a fully locked position. To accomplish this task the operator of a fork truck positions the tote on the tilt stand with the side wall abutting the upstanding angular portions 40, the fork truck operator then lifts the moveable frame portion 30 which allows the spring steel portion 60 assisted by lugs 63 and 64 and the weight thereof to pivot in a counterclockwise direction thus allowing, at a point where the end 70a enters the opening 29a, locking of the tilt stand in a tilted position, the fork is then removed from the frame and the tote is in a position for use. A tongue portion 35 is provided within the tilt stand 10 affixed to a moveable frame portion 30 at 35b and to a large bolt 65 affixed to the spring steel section 60 through an elongated slot 35a in the tongue member 35. The elongated slot allows a certain amount of free play in the movement of the bolt head when the struts 70 pivot toward the detents 29. Further, the tongue portion 35 is not welded to the spring steel portion 60 but is disposed a certain vertical distance above it to allow for a certain amount of free play in the release mechanism which will be hereinafter described.

Figure 4:
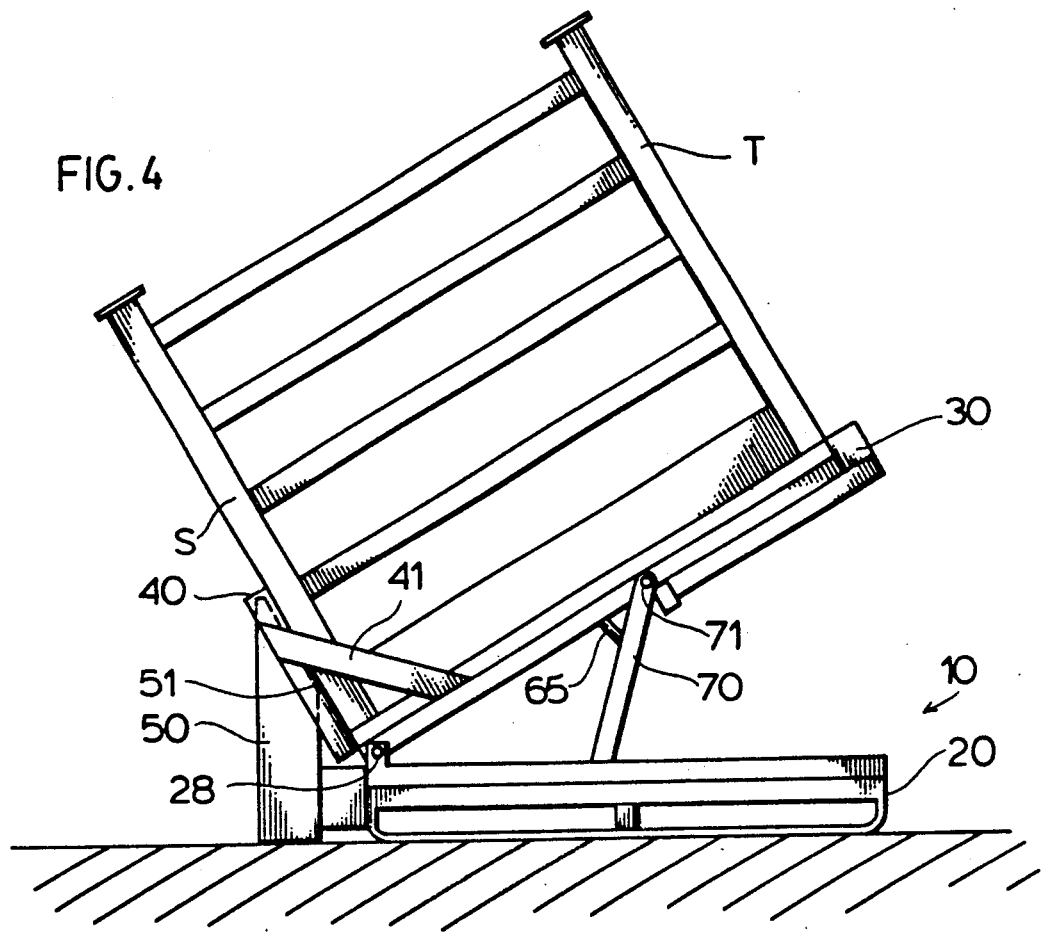
FIG. 4 is a side view of the tilt stand of FIG. 1 and 2 illustrating a tote tilted in position on the tilt stand in the preferred embodiment of the invention.
Figure 5:
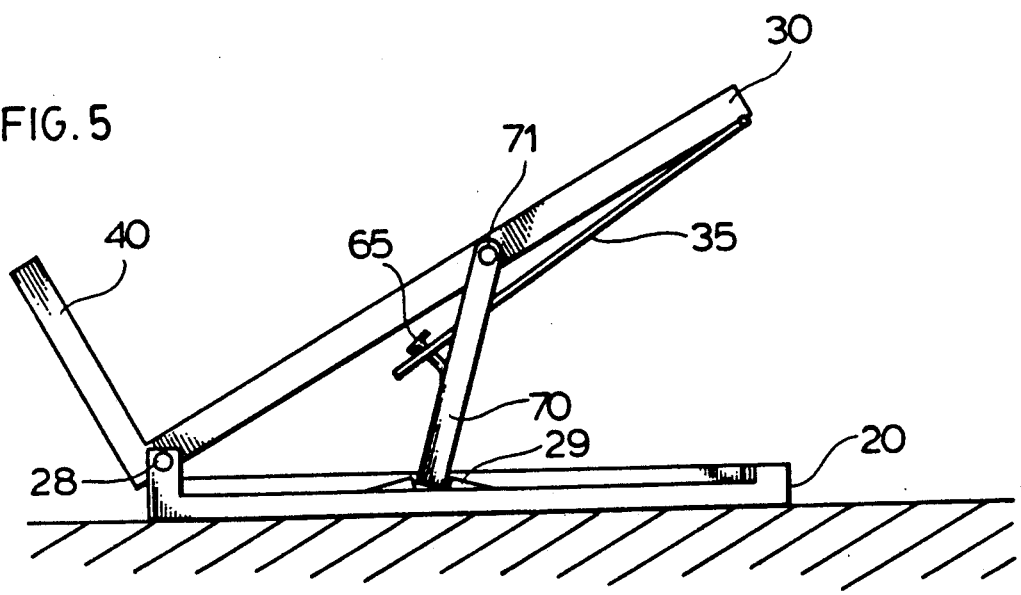
FIG. 5 is a similar view to that of FIG. 4 with a portion of the horizontal framing members stripped away to illustrate schematically the latching of the tilted member in position illustrated in a preferred embodiment of the invention.

Referring now to FIGS. 4 and 5, a tote T is disposed upon the tilt stand in a fully tilted locked position. Thus, the tote abuts the upstanding rectangular supports 40 at the side of the tilt stand proximate the pivots 28. Further braced by bracing portions 50 which have an inclined face 51, the upwardly extending brace portions 50 being stationary at all times as clearly seen in relation to FIG. 1 and being an extension of the stationary frame portion 20 thereby providing extra bracing for a tote when in a tilting position when the inclined faces 51 of the upwardly extending supports 50 engage the inner generally C-shaped channel forming the uprights 40 of the upwardly extending supports 40 thus in fact, the tote is braced, firstly by the members 40, the members 40 being further braced by the inclined face 51. The pivotable portion 30 has the downwardly extending struts 70 pivoted at 71 preferably pivoted at a point closer the side portion 33 of the moveable frame 30 so that the strut does not pivot beyond the 90° point prior to being locked in position. As is clearly seen in FIG. 5, the tongue portion 35 remains affixed to the bolt 65 which is affixed to the spring steel portion 60 (not shown in FIG. 5) which is affixed to the struts located at each end of the tilt stand 10. Therefore when a tilt stand is located adjacent an operating area for example, as described in the background of the invention, a stamping operation, an operator may access the tote at side S in order to carefully load the blanks or the finished metal stampings into the tote thereby improving the utilization of the volume of the tote. This can have a very large impact on the productivity of the operation considering the cost of dead freight today. It can also minimize the number of totes required in a process.

Referring now to FIGS. 6, 7 and 8, there is illustrated a sequence of events when a tote is full and it is desired that the tote be returned to the horizontal position and that the tote be replaced with a empty one for continued operation. Thus, a fork truck operator approaches the tote from the side proximate the framing member 33 wherein is disposed the opening defined by the two side to side extending channel 61 and 62 wherein is disposed the tongue portion 35, the tongue portion being engaged by the forks F of the carriage C in a direction D2. The tongue of course is fastened to the framing portion 30 at point 35b causing the tongue to move from the position illustrated in FIG. 5 wherein the slot 35a is illustrated in FIG. 3, wherein the bolt head is proximate the slot 35a. When the fork presses up on the tongue 35 the tongue at the end of the slot 35a pulls up on the bolt 65 which in turn is affixed to the spring steel 60 which is affixed to the struts 70 thus the struts 70 are pulled up and away from the detent 29 although it does have propensity to stay locked there until such time as the forks overcome the effects of gravity and specifically with the assistance of the weighted portions 63 and 64. Once the strut end 70a is free from the locking detents 29 the forks drop as shown in FIG. 7 causing the end 70a to move in the direction D1 toward the pivot 28 until such time as the frame portion 30 is in a generally co-planar relationship with the stationary frame 20 and the tote resides in a generally horizontal position.

When the tote is originally placed on the tilt stand 10 the fork trucks lift the pivotal frame portion 30 wherein the weight portions as clearly illustrated in FIG. 1 and 2 assist the pivoting of the struts to their locking positions thus assisting the struts to lock without assistance from the operator assisted by gravity only.

As many changes can be made to the preferred embodiments without departing from the scope of the invention; it is intended that all matter contained herein be illustrative of the invention and not in a limiting sense.

The embodiments of the invention in which an exclusive property or privilege is claimed are as follows:

1. A tilt apparatus for tilting a container from a first position, preferably horizontal, to a position skewed to the first position, the tilt apparatus comprising a stationary frame having two sides and disposed proximate the first position, the stationary frame having detent means disposed therewith, a moveable frame moveable from the first position being substantially parallel in extension to the stationary frame to a position skewed to the first position and the stationary frame, the moveable frame being moveably affixed proximate one side of the stationary frame, the moveable frame having locking means and release means disposed therewith, the locking means being actuated by gravity to cooperatively lock with respect to the detent means of the stationary frame when the moveable frame is tilted to allow the locking means to so actuate thus locking a container in a tilted position, the release means being actuated by a remote device, such as a fork of a fork truck, to disengage the locking means of the moveable frame from the detent of the stationary frame whereby the moveable frame is repositioned from a position skewed to the first position and the stationary frame to a position substantially parallel in extension to the first position and the stationary frame.

2. The tilt stand of claim 1 wherein the locking means of the moveable frame further comprises at least one strut having two ends, and being pivotably affixed at one end to the pivotable frame and free at one other end to rotate when free to do so.

3. The tilt stand of claim 2, wherein the at least one strut comprises two, one disposed at each end of the tilt stand interconnected by a shaft having counterweights therewith.

4. The tilt stand of claim 2, wherein the at least one strut is assisted to rotate by counterweight to engage the detent means of the stationary frame.

5. The tilt stand of claim 2, wherein the at least one strut is interconnected to release means which when actuated releases the at least one strut of the moveable frame from the detent means of the stationary frame.

6. The tilt stand of claim 4, wherein the at least one strut is interconnected to release means which when actuated releases the at least one strut of the moveable frame from the detent means of the stationary frame.

7. The tilt stand of claim 2, wherein the detent means are at least two opposed teeth having a space disposed therebetween for locking engagement of the free end of the at least one strut.

8. The tilt stand of claim 4, wherein the detent means are at least two opposed teeth having a space disposed therebetween for locking engagement of the free end of the at least one strut.

9. The tilt stand of claim 5, wherein the detent means are at least two opposed teeth having a space disposed therebetween for locking engagement of the free end of the at least one strut.

10. The tilt stand of claim 6, wherein the detent means are at least two opposed teeth having a space disposed therebetween for locking engagement of the free end of the at least one strut.

11. A tilt stand for tilting a container from a generally horizontal position to a position skewed to the horizontal, the tilt stand comprising a stationary frame having two sides and extending substantially horizontally, the stationary frame being reinforced by reinforcing means and having disposed therewith detent means, a pivotable frame having reinforcing means therewith to bolster the frame to accept the container, the pivotable frame pivotable from a position generally parallel in extension to the stationary frame to a position generally skewed to the extension of the stationary frame, the pivotable frame being pivotably affixed proximate one side of the stationary frame, the pivotable frame having locking means and release means disposed therewith, the locking means being actuated by gravity to cooperatively lock with respect to the detent means of the stationary frame when the pivotable frame is tilted to allow the locking means to activate thus locking a container in a tilted position with its bottom at a skewed angle to the horizontal, the release means being actuated by a remote device, such as a fork of a fork truck, to disengage the locking means of the pivotable frame from the detent means of the stationary frame, whereby the pivotable frame and a container therewith is repositioned from a position skewed to the horizontal to a position parallel in extension to the stationary frame.

12. The tilt stand of claim 11, wherein the stationary frame and the pivotable frame further comprises generally upstanding reinforcing portions disposed at the sides of the frames which are affixed to assist in supporting a container when tilted.

13. The tilt stand of claim 12, wherein the upstanding portions of the stationary frame cooperating with the upstanding portions of the pivotable frame, when a container is in a tilted position.

14. The tilt stand of claim 12 or 13, wherein the locking means of the pivotable frame further comprises at least one strut having two ends, and being pivotably affixed at one end to the pivotable frame and free at one other end to rotate when free to do so.

15. The tilt stand of claim 14, wherein the at least one strut comprises two, one disposed at each end of the tilt stand interconnected by a shaft having counterweights therewith.

16. The tilt stand of claim 14, wherein the at least one strut is assisted to rotate by counterweight to engage the detent means of the stationary frame.

17. The tilt stand of claim 14, wherein the at least one strut is interconnected to release means which when actuated releases the at least one strut of the pivotable frame from the detent means of the stationary frame.

18. The tilt stand of claim 16, wherein the at least one strut is interconnected to release means which when actuated releases the at least one strut of the pivotable frame from the detent means of the stationary frame.

19. The tilt stand of claim 14, wherein the detent means are at least two opposed teeth having a space disposed therebetween for locking engagement of the free end of the at least one strut.

20. The tilt stand of claim 16, wherein the detent means are at least two opposed teeth having a space disposed therebetween for locking engagement of the free end of the at least one strut.

21. The tilt stand of claim 17, wherein the detent means are at least two opposed teeth having a space disposed therebetween for locking engagement of the free end of the at least one strut.

22. The tilt stand of claim 18, wherein the detent means are at least two opposed teeth having a space disposed therebetween for locking engagement of the free end of the at least one strut.

23. The tilt stand of claim 11, wherein the locking means of the pivotable frame further comprises at least one strut having two ends, and being pivotably affixed at one end to the pivotable frame and free at one other end to rotate when free to do so.

24. The tilt stand of claim 23, wherein the at least one strut comprises two, one disposed at each end of the tilt stand interconnected by a shaft having counterweights therewith.

25. The tilt stand of claim 23, wherein the at least one strut is assisted to rotate by counterweight to engage the detent means of the stationary frame.

26. The tilt stand of claim 23, wherein the at least one strut is interconnected to release means which when actuated releases the at least one strut of the pivotable frame from the dent means of the stationary frame.

27. The tilt stand of claim 25, wherein the at least one strut is interconnected to release means which when actuated releases the at least one strut of the pivotable frame from the dent means of the stationary frame.

28. The tilt stand of claim 23, wherein the detent means are at least two opposed teeth having a space disposed therebetween for locking engagement of the free end of the at least one strut.

29. The tilt stand of claim 25, wherein the detent means are at least two opposed teeth having a space disposed therebetween for locking engagement of the free end of the at least one strut.

30. The tilt stand of claim 26, wherein the detent means are at least two opposed teeth having a space disposed therebetween for locking engagement of the free end of the at least one strut.

31. The tilt stand of claim 25, wherein the detent means are at least two opposed teeth having a space disposed therebetween for locking engagement of the free end of the at least one strut.

* * * * *